United States Patent
Lim et al.

(10) Patent No.: US 7,873,342 B2
(45) Date of Patent: Jan. 18, 2011

(54) LOW IF RECEIVER OF REJECTING IMAGE SIGNAL AND IMAGE SIGNAL REJECTION METHOD

(75) Inventors: Kyoo Hyun Lim, Gyeonggi-do (KR); Sun Ki Min, Gyeonggi-do (KR)

(73) Assignee: FCI Inc., Seongnam-si (KR)

( * ) Notice: Subject to any disclaimer, the term of this patent is extended or adjusted under 35 U.S.C. 154(b) by 637 days.

(21) Appl. No.: 11/871,008

(22) Filed: Oct. 11, 2007

(65) Prior Publication Data
US 2008/0096513 A1 Apr. 24, 2008

(30) Foreign Application Priority Data
Oct. 20, 2006 (KR) .................... 10-2006-0102280

(51) Int. Cl.
*H04B 1/18* (2006.01)
*H04K 3/00* (2006.01)
(52) U.S. Cl. ...................... 455/285; 455/302
(58) Field of Classification Search ............... 455/285, 455/302, 324
See application file for complete search history.

(56) References Cited

U.S. PATENT DOCUMENTS 6,892,060 B2 * 5/2005 Zheng ................. 455/302
2008/0132191 A1 * 6/2008 Quinlan et al. .......... 455/302

* cited by examiner

*Primary Examiner*—Lee Nguyen
(74) *Attorney, Agent, or Firm*—Kile Park Goekjian Reed & McManus PLLC

(57) ABSTRACT

Provided are an image signal rejection method capable of avoiding demodulation of an image signal along with a real signal in a radio frequency (RF) signal and a low IF receiver of rejecting an image signal by using the method. The low IF receiver of rejecting an image signal includes a low noise amplifier, a quadrature I/Q mixer, a signal complex filter, and a phase and gain control block. The low noise amplifier amplifies a radio frequency (RF) signal. The quadrature I/Q mixer generates an I signal and a Q signal by down-converting the amplified RF signal into an IF signal. The phase and gain control block generates an I' signal and a Q' signal which are obtained by changing phases and amplitudes of the I signal and the Q signal by using a real signal. The signal complex filter minimizing the image signal in the IF signal and passing the real signal by performing filtering on the I' signal and the Q' signal.

7 Claims, 4 Drawing Sheets

LOW IF RECEIVER OF REJECTING IMAGE SIGNAL AND IMAGE SIGNAL REJECTION METHOD

This application claims priority to Korean Patent Application No. 10-2006-0102280, filed on Oct. 20, 2006, respectively, all the benefits accruing therefrom under 35 U.S.C. §119, the contents of which in its entirety is incorporated herein by reference.

BACKGROUND OF THE INVENTION

1. Field of the Invention

The present invention relates to a low intermediate frequency (IF) receiver, and more particularly, to a low IF receiver of rejecting an image signal to minimize image components in a radio frequency (RF) signal.

2. Description of the Related Art

FIG. 1 is a block diagram illustrating a conventional low intermediate frequency (IF) receiver.

Referring to FIG. 1, the conventional low IF receiver 100 includes an antenna, a low noise amplifier (LNA) 110, a quadrature I/Q mixer 120, a signal complex filter 130, and a variable gain amplifier 140.

The antenna receives electromagnetic waves Sin in the air. The LNA 110 amplifies a radio frequency (RF) signal while rejecting noise in the received signal Sin as much as possible. The quadrature I/Q mixer 120 down-converts the RF signal into an IF signal in a baseband which is a frequency band including original signals by removing a carrier frequency to generate an I signal and a Q signal. Since the down-converted signals include signals in various channels, the signal complex filter 130 which performs a band pass filtering function selects signals in a desired channel from the down-converted signals. Since the received signal Sin cannot be sufficiently amplified by using only the LNA 110, and a signal amplification ratio has to be accurately adjusted, the variable gain amplifier 140 amplifies and outputs the signal received from the signal complex filter 130.

The low IF receiver 100 performs a function of receiving the RF signal. The RF signal includes an image signal in addition to a real signal that is to be received. Here, the image signal is not a signal internally generated when the mixer 120 of the receiver 100 performs mixing but an externally received signal such as a signal in an adjacent channel. When the mixer 120 down-converts the RF signal Sin into the IF signal, both the real signal and the image signal are down-converted on the basis of the IF frequency.

As described above, the image signal that is simultaneously down-converted works as a quantity of interrupting demodulation of the received signal. Therefore, how much quantity of the image signal is rejected determines selectivity of the low IF receiver.

Conventionally, in order to improve the performance to reject the image signal, a digital signal processing method is used. In this method, a high-performance analog-to-digital (ADC) converter converts an analog signal into digital signal, and a digital filter rejects an image signal in the digital signal and selects only a desired signal.

According to the aforementioned method, there are problems in that a construction of a receiver system is complex, and manufacturing costs are increased.

SUMMARY OF THE INVENTION

The present invention provides a low intermediate frequency (IF) receiver of rejecting an image signal capable of avoiding demodulation of an image signal along with a real signal in an IF signal.

The present invention also provides an image signal rejection method capable of avoiding demodulation of an image signal along with a real signal in an IF signal.

According to an aspect of the present invention, there is provided a low IF receiver of rejecting an image signal including a low noise amplifier, a quadrature I/Q mixer, a signal complex filter, and a phase and gain control block. The low noise amplifier amplifies a radio frequency (RF) signal. The quadrature I/Q mixer generates an I signal and a Q signal by down-converting the amplified RF signal into an IF signal. The phase and gain control block generates an I' signal and a Q' signal which are obtained by changing phases and amplitudes of the I signal and the Q signal by using a real signal. The signal complex filter minimizing the image signal in the IF signal and passing the real signal by performing filtering on the I' signal and the Q' signal.

According to another aspect of the present invention, there is provided an image signal rejection method of passing a real signal in a received RF signal and minimizing an image signal in the received RF signal, including: detecting values of power of the real signal in the RF signal and power of the image signal in the RF signal, which are changed by controlling phases and gains of an I signal and a Q signal obtained by mixing the RF signal, and measuring and storing a difference between the values of the power of the real signal and the power of the image signal and fixing the phases and amplitudes of the I signal and the Q signal obtained by mixing the RF signal, by using a phase control signal and a gain control signal corresponding to a maximum value of the measured differences.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the attached drawings.

Figure 1:
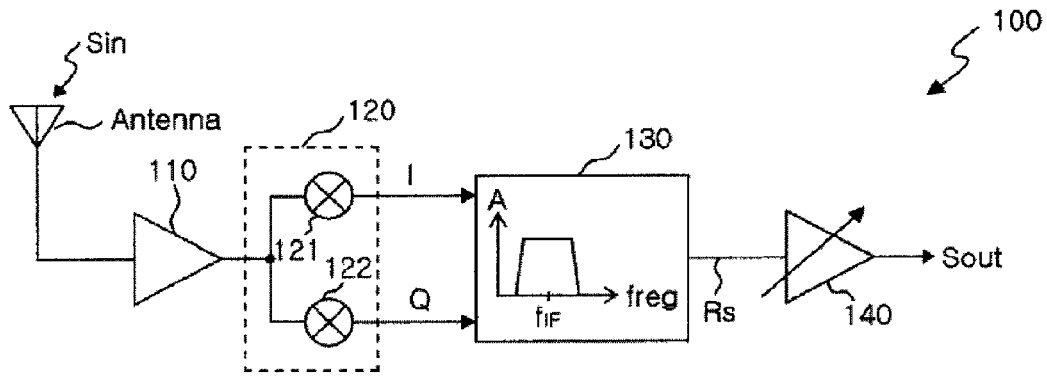
FIG. 1 is a block diagram illustrating a conventional low intermediate frequency (IF) receiver.
Figure 2:
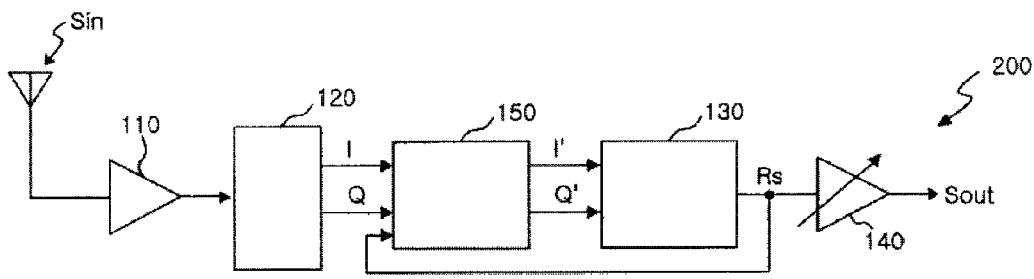
FIG. 2 is a block diagram illustrating a low IF receiver of rejecting an image signal according to the present invention.

FIG. 2 is a block diagram illustrating a low intermediate frequency (IF) receiver of rejecting an image signal according to the present invention.

Referring to FIG. 2, the low IF receiver 200 of rejecting an image signal according to the present invention includes a low noise amplifier 110, a quadrature I/Q mixer 120, a signal complex filter 130, a variable gain amplifier 140, and a phase and gain control block 150.

The low noise amplifier 110 amplifies a radio frequency (RF) signal. The quadrature I/Q mixer 120 down-converts the amplified RF signal into an IF signal to generate an I signal and a Q signal. Here, the I signal and the Q signal are signals having a phase difference of 90°.

The phase and gain control block 150 generates an I' signal and a Q' signal obtained by changing phases and amplitudes of the I signal and the Q signal by using a real signal Rs. The signal complex filter 130 performs filtering on the I' signal and the Q' signal to minimize the image signal in the IF signal and maintain the amplitude of the real signal Rs in the IF signal. The variable gain amplifier 140 amplifies and outputs the real signal Rs output from the signal complex filter 130.

Figure 3:
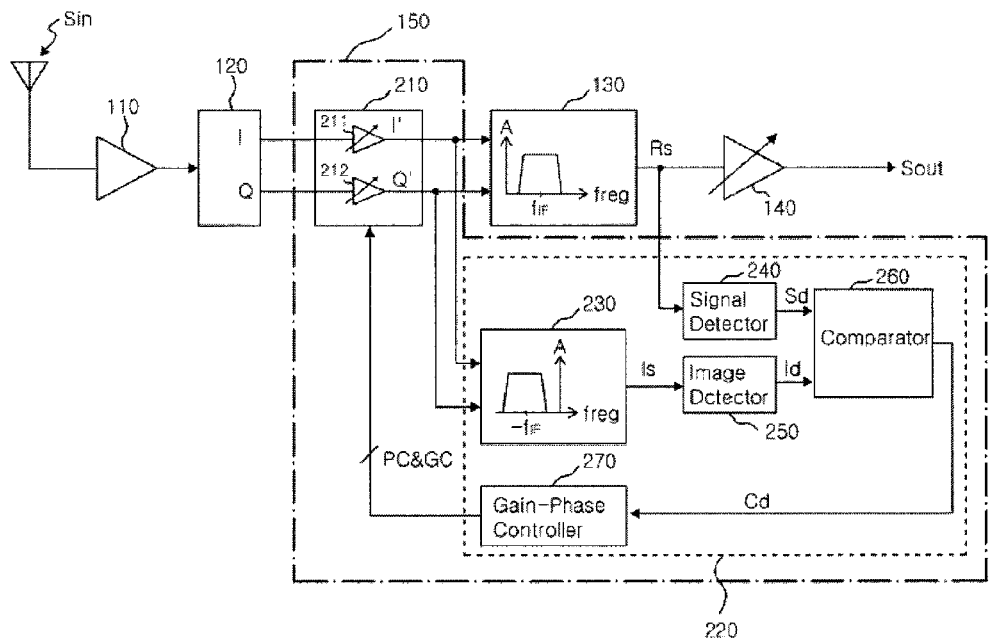
FIG. 3 is a detailed block diagram illustrating a phase and gain control block 150 of the low IF receiver 200 of rejecting an image signal according to the present invention illustrated in FIG. 2.

FIG. 3 is a detailed block diagram illustrating the phase and gain control block 150 of the low IF receiver 200 of rejecting an image signal according to the present invention illustrated in FIG. 2.

Referring to FIG. 3, the phase and gain control block 150 includes a phase and gain control circuit 210 and a control signal generation circuit 220.

The phase and gain control circuit 210 changes phases and gains of the I signal and the Q signal in response to a phase control signal PC used for controlling a phase and a gain control signal GC used for controlling a gain (or amplitude).

The phase and gain control circuit 210 includes an I signal control circuit 211 and a Q signal control circuit 212. The I signal control circuit 211 generates the I' signal by controlling the phase and the gain of the I signal in response to one or more of the phase control signal PC and the gain control signal GC. The Q signal control circuit 211 generates the Q' signal by controlling the phase and the gain of the Q signal in response to one or more of the phase control signal PC and the gain control signal GC.

The control signal generation circuit 220 generates the phase control signal PC and the gain control signal GC by using the I signal, the Q' signal, and the real signal Rs and includes an image complex filter 230, a real signal power detector 240, an image signal power detector 250, a signal comparator 260, and a phase and gain control signal generator 270.

The image complex filter 230 performs filtering on the I' signal and the Q' signal output from the phase and gain control circuit 210 to minimize the real signal Rs in the IF signal and maintains the amplitude of the image signal Is in the IF signal. The real signal power detector 240 outputs a real power signal Sd corresponding to the power of the real signal Rs output from the signal complex filter 130. The image signal power detector 250 generates an image power signal Id corresponding to the power of the image signal Is. The real power signal Sd and the image power signal Id reflect the amplitudes of the phase control signal PC and the gain control signal GC, so that the amplitudes of the real power signal Sd and the image power signal Id can be represented as digital signal or an analog signal.

The signal comparator 260 generates a comparison signal Cd corresponding to a difference between the power of the real power signal Sd and the image power signal Id. The signal comparator 260 outputs the comparison signal Cd to fix one or more values of the phase and the amplitude of one of the real power signal Sd and the image power signal Id and change the phase and the amplitude of the other signal thereof (refer to the description of FIG. 9).

The phase and gain control signal generator 270 outputs the phase control signal PC and the gain control signal GC in response to the comparison signal Cd. An image rejection ratio is more sensitive to a mismatch between gains than a mismatch between phases, so that the gain control signal GC is firstly transmitted to the phase and gain control circuit 210 to control gains of the I signal control circuit 211 and the Q signal control circuit 212. Next, the phase control signal PC is then transmitted to the phase and gain control circuit 210 to control phases of the I signal control circuit 211 and the Q signal control circuit 212.

The signal comparator 260 detects a time point when a difference between the real power signal Sd and the image power signal Id is maximized and stores the comparison signal Cd corresponding to the time point. Therefore, after the maximum difference value is detected, if a specific change does not occur, the real signal Rs that has least image signal components as much as possible is continuously output by using the comparison signal Cd.

The low IF receiver 200 further includes a variable gain amplifier 140 for amplifying the real signal Rs.

Figure 4:
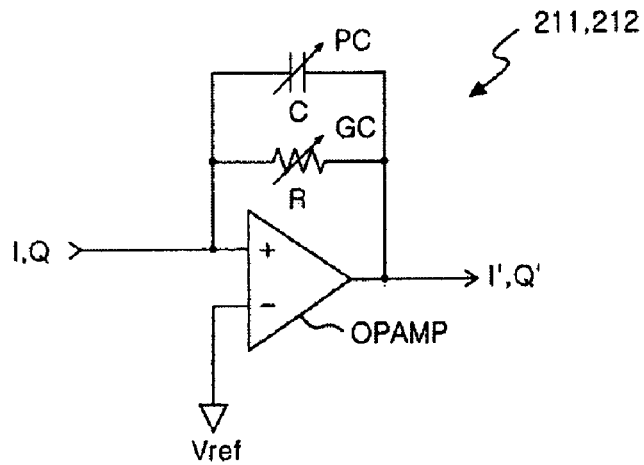
FIG. 4 is a view illustrating an embodiment of an I signal control circuit 211 and a Q signal control circuit 212 illustrated in FIG. 3.

FIG. 4 is a view illustrating an embodiment of the I signal control circuit 211 and the Q signal control circuit 212 illustrated in FIG. 3.

Referring to FIG. 4, the I signal control circuit 211 includes an operation amplifier OP AMP, a variable resistor R, and a variable capacitor C. A positive input terminal (+) of the operation amplifier OP AMP is applied with the I signal, and a negative input terminal (−) thereof is applied with a reference value Vref. Here, the reference voltage includes a ground voltage GND. The variable resistor R is connected between the positive input terminal and an output terminal of the operation amplifier OP AMP, and a resistance of the variable resistor R is changed in response to the gain control signal GC. The variable capacitor C is connected between the positive input terminal and the output terminal of the operation amplifier OP AMP, and a capacitance of the variable capacitor C is changed in response to the phase control signal PC.

Referring to FIG. 4, the Q signal control circuit 212 includes the operation amplifier OP AMP, a variable resistor R, and a variable capacitor C. A positive input terminal (+) of the operation amplifier OP AMP is applied with the Q signal, and a negative input terminal (−) thereof is applied with the reference value Vref. The variable resistor R is connected between the positive input terminal and the output terminal of the operation amplifier OP AMP, and a resistance of the variable resistor R is changed in response to the gain control signal GC. The variable capacitor C is connected between the positive input terminal and the output terminal of the operation amplifier OP AMP, and a capacitance of the variable capacitor C is changed in response to the phase control signal PC.

Here, the I signal control circuit 211 and the Q signal control circuit 212 may be applied with the same phase control signal and the same gain control signal, or applied with different phase control signals and different gain control signals.

FIG. 4 illustrates the embodiment of the I signal control circuit 211 and the Q signal control circuit 212 when a single path is used. When a differential path is used, another embodiment as illustrated in FIG. 5 may be implemented.

Figure 5:
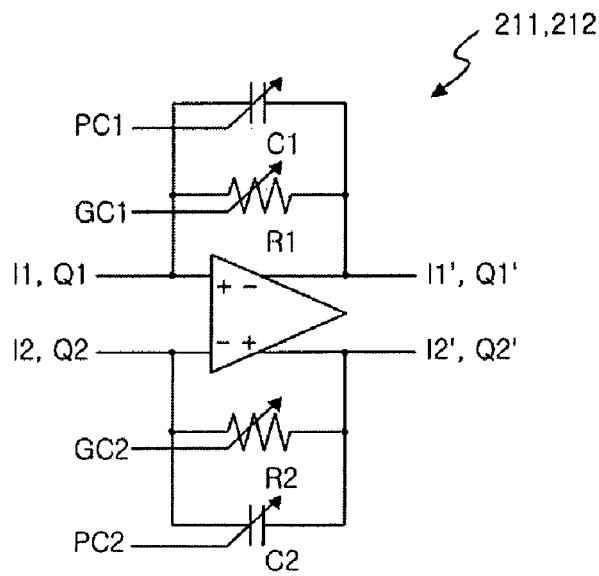
FIG. 5 is a view illustrating another embodiment of the I signal control circuit 211 and the Q signal control circuit 212 illustrated in FIG. 3.

FIG. 5 is a view illustrating another embodiment of the I signal control circuit 211 and the Q signal control circuit 212 illustrated in FIG. 3.

Operations of the I signal control circuit 211 and the Q signal control circuit 212 in another embodiment illustrated in FIG. 5 can be easily understood with reference to FIG. 4, so that a detailed description thereof is omitted.

Figure 6:
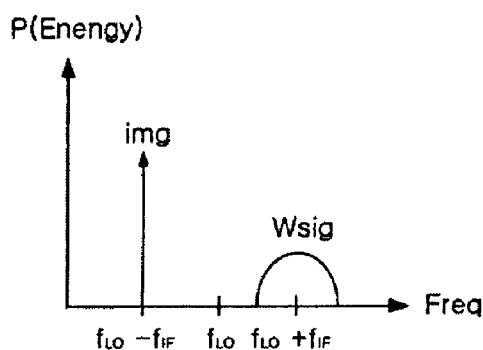
FIG. 6 is a view illustrating power of a real signal and an image signal in a RF signal Sin illustrated in FIG. 3.

FIG. 6 is a view illustrating power of the real signal and the image signal in the RF signal Sin illustrated in FIG. 3.

Figure 7:
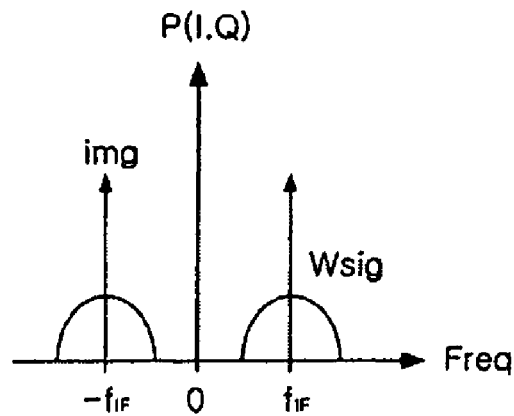
FIG. 7 is a view illustrating power of signals output from a quadrature I/Q mixer 120 illustrated in FIG. 3.

FIG. 7 is a view illustrating power of the signals output from the quadrature I/Q mixer 120 illustrated in FIG. 3.

Figure 8:
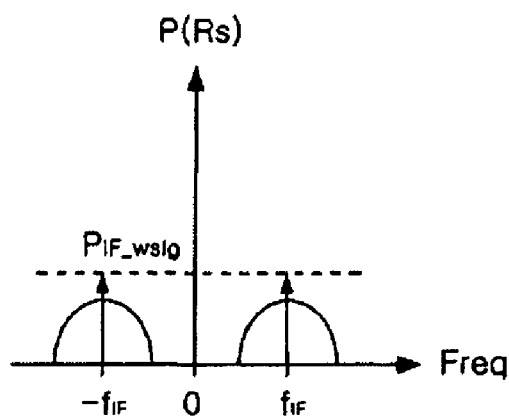
FIG. 8 is a view illustrating power of signals output from a signal complex filter 130 illustrated in FIG. 3.

FIG. 8 is a view illustrating power of the signals output from the signal complex filter 130 illustrated in FIG. 3.

Figure 9:
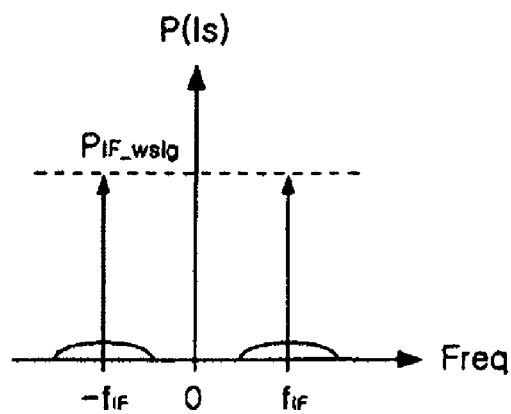
FIG. 9 is a view illustrating power of signals output from an image complex filter 230 illustrated in FIG. 3.

FIG. 9 is a view illustrating power of the signals output from the image complex filter 230 illustrated in FIG. 3.

Figure 10:
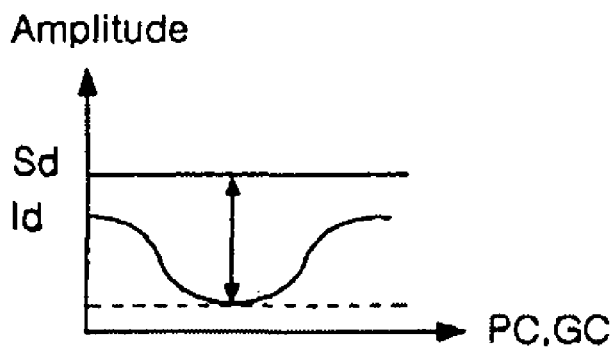
FIG. 10 is a view illustrating power of a real power signal Sd and an image power signal Id when a value of the real power signal Sd is fixed and a value of the image power signal Id is changed by using two variables PC and GC.

FIG. 10 is a view illustrating power of the real power signal Sd and the image power signal Id when a value of the real power signal Sd is fixed and a value of the image power signal Id is changed by using two variables PC and GC.

Hereinafter, operations of the low IF receiver of rejecting an image signal according to the present invention illustrated in FIGS. 2 and 3 are described with reference to FIGS. 6 to 10.

Referring to FIG. 6, the RF signal which is received by the antenna of the low IF receiver of rejecting an image signal according to the present invention illustrated in FIG. 2 and amplified by the low noise amplifier 110 includes a real signal Wsig that is to be received and an image signal img.

Referring to FIG. 6, the real signal Wsig and the image signal img are down-converted into IF frequencies while passing through the quadrature I/Q mixer 120. Here, the real signal Wsig and the image signaling are mixed and exist in an IF frequency $f_{IF}$ and a negative IF frequency $-f_{IF}$, respectively.

The I signal and the Q signal which are output from the quadrature I/Q mixer 120 and down-converted into the IF frequencies are input to the signal complex filter 130 and the image complex filter 230, respectively.

Referring to FIG. 8, the signal complex filter 130 maintains the amplitude of the real signal Wsig that is to be received and decreases the amplitude of the image signal img as much as possible by using the I signal and the Q signal.

Referring to FIG. 9, the image complex filter 230 maintains the amplitude of the image signal img and decreases the amplitude of the real signal Wsig that is to be received as much as possible by using the I signal and the Q signal.

The real signal power detector 240 outputs the real power signal Sd corresponding to the power of the real signal Rs. The image signal power detector 250 outputs the image power signal Id corresponding to the power of the image signal Is. Here, the real power signal Sd and the image power signal Id are represented as digital signal reflecting the amplitudes of the phase control signal and the gain control signal applied to the RF signal.

The signal comparator 260 receives the real power signal Sd and the image power signal Id compares power therebetween.

Referring to FIG. 10, values of the two power signals are compared by fixing the value of the real power signal Sd and changing the value of the image power signal Id by using the two variables PC and GC. A signal obtained as a result of comparing the fixed value of the real power signal Sd and the changed value of the image power signal Id is the comparison signal Cd. Here, a change in the value of the image power signal Id can be obtained by changing the values of the phase control signal PC and the gain control signal GC. When the values of the phase control signal PC and the gain control signal GC are changed, the values of the I' signal and the Q' signal are also changed, so that the value of the image power signal Id is also changed.

The phase and gain control signal generator 270 outputs the phase control signal PC and the gain control signal GC in response to the comparison signal Cd.

As described above, a difference between power of signals which are output from the quadrature I/Q mixer 120 of the low IF receiver of rejecting an image signal according to the present invention is detected by passing the signals through the complex filter 130 or 230 and the signal power detector 240 or 250, and phases and amplitudes of the signals output from the quadrature I/Q mixer 120 are controlled by using the result of the detecting, so that the image signal img is not included in the signal Wsig selected through the signal complex filter 130.

When it is assumed that gains of the low noise amplifier 110 illustrated in FIG. 2, the quadrature I/Q mixer 120, the two control circuits 211 and 212 included in the phase and gain control circuit 210, and the two complex filters 130 and 230 are 1, the following Equations 1 to 6 can be obtained.

$P_{RF} = P_{RF\text{-}Wsig} + P_{RF\text{-}img}$  [Equation 1]

$P_{IF} = A_{LNA} \cdot A_{MIX} \cdot P_{RF} = (P_{RF\text{-}Wsig} + P_{RF\text{-}img})$  [Equation 2]

$P_{IF\text{-}Wsig} = P_{RF\text{-}Wsig} + (P_{RF\text{-}img} - IRR)$  [Equation 3]

$P_{IF\text{-}img} = P_{RF\text{-}img} + (P_{RF\text{-}Wsig} - IRR)$  [Equation 4]

$S_d = |P_{IF\text{-}Wsig}|$  [Equation 5]

$I_d = |P_{IF\text{-}img}|$  [Equation 6]

Here, Equation 1, Equation 2, Equation 3, and Equation 4 correspond to FIG. 6, FIG. 7, FIG. 8, and FIG. 9, respectively. Equation 5 represents output power of the real signal power detector 240, and Equation 6 represents output power of the image signal power detector 250. Here, IRR means Image Rejection Ratio.

Figure 11:
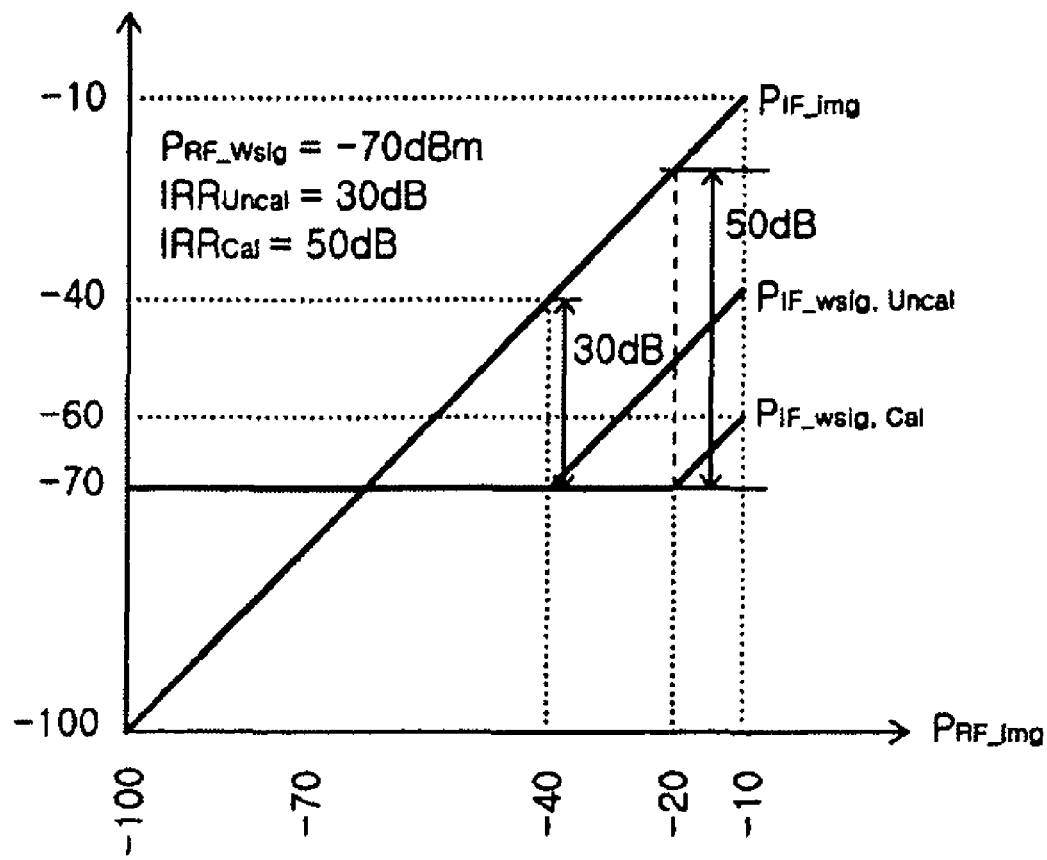
FIG. 11 illustrates image rejection ratios which are measured by increasing the amplitude of an image signal $P_{IF-img}$ in a case where the low IF receiver according to the present invention is used and in a conventional case.

FIG. 11 illustrates image rejection ratios IRR which are measured by increasing the amplitude of the image signal $P_{IF\text{-}img}$ in a case where the low IF receiver according to the present invention is used and in a conventional case.

Referring to FIG. 11, when the amplitude of the real signal $P_{IF\text{-}Wsig}$ is fixed as −70 dBm and the amplitude of the image signal $P_{IF\text{-}img}$ is increased, the IRR of about 30 dB is obtained in the conventional case, and the IRR of about 50 dB is obtained in the case according to the present invention.

Accordingly, the low IF receiver and the image signal rejection method used in the low IF receiver according to the present invention has advantages in that a concept thereof is simple, circuits included in the phase and gain control block 150 which is added to a conventional circuit are simple. Therefore, designing a new circuit is not needed, and the circuits can be implemented by using a conventional analog circuit as it is or by some modifications thereof. In addition, since the circuits are generally verified, the circuits can be easily implemented as a semiconductor integrated circuit. Therefore, circuits are simple as compared with the conventional method and system, so that costs to implement the circuits are not significantly increased.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A low IF (intermediate frequency) receiver of rejecting an image signal, comprising:
   a low noise amplifier amplifying a radio frequency (RF) signal;
   a quadrature I/Q mixer generating an I signal and a Q signal by down-converting the amplified RF signal into an IF signal;
   a phase and gain control block generating an I' signal and a Q' signal which are obtained by changing phases and amplitudes of the I signal and the Q signal by using a real signal; and
   a signal complex filter minimizing the image signal in the IF signal and passing the real signal by performing filtering on the I' signal and the Q' signal;
   wherein the phase and gain control block comprises:
   a phase and gain control circuit generating the I' signal and the Q' signal which are obtained by changing the phases and gains of the I signal and the Q signal in response to a phase control signal used for controlling a phase and a gain control signal used for controlling a gain; and
   a control signal generation circuit generating the phase control signal and the gain control signal by using the I' signal, the Q' signal, and the real signal output from signal complex filter;
   wherein the phase and gain control circuit comprises:
   an I signal control circuit outputting the I' signal by controlling the phase and the gain of the I signal in response to the phase control signal and the gain control signal; and
   a Q signal control circuit outputting the Q' signal by controlling the phase and the gain of the Q signal in response to the phase control signal and the gain control signal;
   wherein the I signal control circuit comprises:
   a first operation amplifier including a positive input terminal applied with the I signal and a negative input terminal applied with a reference voltage;
   a first variable resistor which is connected between the positive input terminal and an output terminal of the first operation amplifier and has a resistance that is changed in response to the gain control signal; and
   a first variable capacitor which is connected between the positive input terminal and the output terminal of the first operation amplifier and has a capacitance that is changed in response to the phase control signal, and
   wherein the Q signal control circuit comprises:
   a second operation amplifier including a positive input terminal applied with the Q signal and a negative input terminal applied with the reference voltage;
   a second variable resistor which is connected between the positive input terminal and an output terminal of the second operation amplifier and has a resistance that is changed in response to the gain control signal; and
   a second variable capacitor which is connected between the positive input terminal and the output terminal of the second operation amplifier and has a capacitance that is changed in response to the phase control signal.

2. A low IF (intermediate frequency) receiver of rejecting an image signal, comprising:
   a low noise amplifier amplifying a radio frequency (RF) signal;
   a quadrature I/Q mixer generating an I signal and a Q signal by down-converting the amplified RF signal into an IF signal;
   a phase and gain control block generating an I' signal and a Q' signal which are obtained by changing phases and amplitudes of the I signal and the Q signal by using a real signal; and
   a signal complex filter minimizing the image signal in the IF signal and passing the real signal by performing filtering on the I' signal and the Q' signal;
   wherein the phase and gain control block comprises:
   a phase and gain control circuit generating the I' signal and the Q' signal which are obtained by changing the phases and gains of the I signal and the Q signal in response to a phase control signal used for controlling a phase and a gain control signal used for controlling a gain; and
   a control signal generation circuit generating the phase control signal and the gain control signal by using the I' signal, the Q' signal, and the real signal output from signal complex filter;
   wherein the phase and gain control circuit comprises:
   an I signal control circuit outputting the I' signal by controlling the phase and the gain of the I signal in response to the phase control signal and the gain control signal; and
   a Q signal control circuit outputting the Q' signal by controlling the phase and the gain of the Q signal in response to the phase control signal and the gain control signal;
   wherein the I signal control circuit comprises:
   a first operation amplifier including a positive input terminal applied with a first I signal and a negative input terminal applied with a second I signal;
   a first variable resistor which is connected between the positive input terminal and a first output terminal of the first operation amplifier and has a resistance that is changed in response to the gain control signal;
   a second variable resistor which is connected between the negative input terminal and a second output terminal of the first operation amplifier and has a resistance that is changed in response to the gain control signal;
   a first variable capacitor which is connected between the positive input terminal and the first output terminal of the first operation amplifier and has a capacitance that is changed in response to the phase control signal; and
   a second variable capacitor which is connected between the negative input terminal and the second output terminal of the first operation amplifier and has a capacitance that is changed in response to the phase control signal, and
   wherein the Q signal control circuit comprises:
   a second operation amplifier including a positive input terminal applied with a first Q signal and a negative input terminal applied with a second Q signal;
   a third variable resistor which is connected between the positive input terminal and a first output terminal of the second operation amplifier and has a resistance that is changed in response to the gain control signal;
   a fourth variable resistor which is connected between the negative input terminal and a second output terminal of the second operation amplifier and has a resistance that is changed in response to the gain control signal;

a third variable capacitor which is connected between the positive input terminal and the first output terminal of the second operation amplifier and has a capacitance that is changed in response to the phase control signal; and a fourth variable capacitor which is connected between the negative input terminal and the second output terminal of the second operation amplifier and has a capacitance that is changed in response to the phase control signal.

3. A low IF (intermediate frequency) receiver of rejecting an image signal, comprising:

a low noise amplifier amplifying a radio frequency (RF) signal;

a quadrature I/Q mixer generating an I signal and a Q signal by down-converting the amplified RF signal into an IF signal;

a phase and gain control block generating an I' signal and a Q' signal which are obtained by changing phases and amplitudes of the I signal and the Q signal by using a real signal; and a signal complex filter minimizing the image signal in the IF signal and passing the real signal by performing filtering on the I' signal and the Q' signal;

wherein the phase and gain control block comprises:

a phase and gain control circuit generating the I' signal and the Q' signal which are obtained by changing the phases and gains of the I signal and the Q signal in response to a phase control signal used for controlling a phase and a gain control signal used for controlling a gain; and a control signal generation circuit generating the phase control signal and the gain control signal by using the I' signal, the Q' signal, and the real signal output from signal complex filter;

wherein the control signal generation circuit comprises:

an image complex filter outputting an image signal in the RF signal by performing filtering on the I' signal and the Q' signal;

a real signal power detector outputting a real power signal corresponding to power of the real signal;

an image signal power detector outputting an image power signal corresponding to power of the image signal;

a signal comparator outputting a comparison signal corresponding to a difference between the power of the real power signal and the image power signal; and a phase and gain control signal generator outputting the phase control signal and the gain control signal in response to the comparison signal.

4. The low IF receiver of claim 3, wherein the real power signal and the image power signal are digital signals or analog signals reflecting the amplitudes of the phase control signal and the gain control signal.

5. The low IF receiver of claim 3, wherein the signal comparator outputs the comparison signal so that the phase and the amplitude of one of the real power signal and the image power signal are not changed and the phase and the amplitude of the other one thereof are changed.

6. The low IF receiver of claim 5, wherein the phase and gain control signal generator firstly outputs the gain control signal to control gains of the I signal control circuit and the Q signal control circuit and then outputs the phase control signal to control the phases of the I signal control circuit and the Q signal control circuit.

7. The low IF receiver of claim 3, wherein the signal comparator detects a time point when a difference between the real power signal and the image power signal is maximized and stores a comparison signal corresponding to the detected time point.

* * * * *